US005702115A

United States Patent [19]

Pool

[11] Patent Number: 5,702,115

[45] Date of Patent: Dec. 30, 1997

[54] PATIENT CARE UTILITY CART

[76] Inventor: L. Frank Pool, 6319 SE. Carlton St., Portland, Oreg. 97206

[21] Appl. No.: 786,487

[22] Filed: Jan. 21, 1997

Related U.S. Application Data

[63] Continuation of Ser. No. 371,302, Jan. 10, 1995, abandoned.

[51] Int. Cl.$^6$ ................................ A47K 1/02; B62B 3/00

[52] U.S. Cl. ................ 280/47.35; 312/209; 312/249.11; 312/249.12; 4/626; 4/630

[58] Field of Search .................................... 280/639, 651, 280/47.34, 47.35, 79.11, 79.2, 79.3; 211/133; 312/209, 249.8, 249.11, 249.12, 249.13; 4/623, 626, 628, 630, 631, 632

[56] References Cited

U.S. PATENT DOCUMENTS

| | | | |
|---|---|---|---|
| D. 188,845 | 9/1960 | Willey . | |
| D. 273,906 | 5/1984 | Norlin . | |
| 996,636 | 7/1911 | Gabriel | 280/47.35 |
| 1,722,456 | 7/1929 | Cranmore | 4/628 |
| 2,926,022 | 2/1960 | Nau et al. | 280/79.3 |
| 3,257,155 | 6/1966 | Worley, Jr. | 312/209 |
| 3,472,392 | 10/1969 | Hahn | 280/47.35 |
| 3,491,381 | 1/1970 | Cathcart | 4/623 |
| 3,505,692 | 4/1970 | Forbes | 4/623 |
| 3,610,429 | 10/1971 | MacKay | 280/79.3 |
| 3,748,437 | 7/1973 | Keeshin et al. | 312/228 |
| 3,853,239 | 12/1974 | McDonald . | |
| 3,920,260 | 11/1975 | Downing . | |
| 3,983,583 | 10/1976 | Herman et al. | 4/631 |
| 4,130,123 | 12/1978 | Wines, Jr. et al. | 4/626 |
| 4,398,310 | 8/1983 | Lienhard | 4/628 |
| 4,652,062 | 3/1987 | Greenwood . | |
| 4,670,010 | 6/1987 | Dragone | 4/623 |
| 4,875,696 | 10/1989 | Welch et al. . | |
| 4,894,874 | 1/1990 | Wilson | 4/623 |
| 4,942,631 | 7/1990 | Rosa | 4/623 |
| 4,974,500 | 12/1990 | Boyd et al. | 4/516 |
| 4,986,555 | 1/1991 | Andreen | 280/47.35 |
| 5,259,668 | 11/1993 | Teufel et al. | 312/249.11 |
| 5,290,058 | 3/1994 | Adams et al. . | |
| 5,301,376 | 4/1994 | Herbert | 4/626 |
| 5,465,438 | 11/1995 | Allman et al. | 4/628 |

FOREIGN PATENT DOCUMENTS

| | | | |
|---|---|---|---|
| 2292617 | 6/1976 | France | 280/659 |

*Primary Examiner*—Brian L. Johnson
*Assistant Examiner*—Min Yu
*Attorney, Agent, or Firm*—Kolisch, Hartwell, Dickinson, McCormack & Heuser

[57] ABSTRACT

A utility cart for facilitating patient care and supporting patient care material is described. The cart includes a frame, plural wheels on the frame, and plural walls mounted on the frame forming two spaced vertical support members defining at least one storage area which may be accessed via a hingedly mounted wall. At least one shelf is mounted between the support members and is bi-directionally extendable on either side of the cart. A bi-directionally extendable drawer, is similarly mounted adjacent the shelves. A sink is provided on the frame, and a console on the cart adjacent the sink includes plural faucets operatively connected to storage tanks for supplying water, soap, and/or moisturizer. Photosensitive switches on the console adjacent the faucets enable no-contact dispensing of various liquids. The console also includes plural information-conveying gauges. Communication devices are provided on the cart, such as an electronic clip board and two-way communication radios for communicating with a remote location.

24 Claims, 6 Drawing Sheets

PATIENT CARE UTILITY CART

This is a continuation of application Ser. No. 08/371,302 filed Jan. 10, 1995 now abandoned.

BACKGROUND AND SUMMARY OF THE INVENTION

This invention relates generally to utility carts, and more specifically to a utility cart for facilitating patient care and supporting patient care material.

Utility carts are widely known to be useful in many different fields. Such carts come in a variety of shapes and sizes and are known to be able to carry many different types of objects that are useful to the user. Utility carts are mobilized by means of bottom-mounted wheels which increase the areas to which the cart may be moved.

Utility carts have found great use in the health care industry. Health care providers such as doctors, nurses, and health care technicians are often required to be able to administer many different types of procedures to a variety of different patients. A utility cart providing mobility and a means to store the required support material for administering such procedures greatly increases the efficiency and patient care effectiveness provided by such health care personnel.

In the health care industry, utility carts have found use in facilities such as hospitals or nursing homes where a health care provider is required to administer numerous different procedures to various patients while maintaining a high degree of mobility. In such facilities, patients or residents are usually required to stay more than one night and are usually placed in rooms having more than one bed with the beds located one next to the other in a side-by-side fashion. While there, residents or patients may undergo many different types of procedures. These procedures may occur while they are waiting for their primary care to be administered or while recuperating therefrom.

Health care providers administering to such residents or patients are generally required to perform one or more the following procedures: cleanse the patient, assist the patient to the bathroom, remove soiled clothing from the patient, deposit the soiled clothing in a sanitary container, remove soiled bed linen from the bed, replace the soiled bed linen with fresh bed linen, administer medical procedures to the patient, record patient information, read patient information, administer required medication to the patient, index and organize required medication for various patients, and/or call for assistance or information at a remote location such as a nurses' station or pharmacy.

During the administration of the above procedures, sanitation and cleanliness are paramount so health care providers must be careful to take measures to ensure that the level of cleanliness is preserved and that patients are not exposed to unsanitary situations or practices. Thus, after administering to one patient and before moving on to the next patient, preventative sanitary measures must be taken. If sanitary gloves were previously worn, the gloves must be removed, disposed of, and a set of fresh gloves must be worn. If no gloves were worn, the hands must be washed with warm water and/or antiseptic soap.

All of these above procedures often require what are known as departures which occur when the health care provider must leave the bedside of the patient to whom they are administering, for the purpose of securing additional supplies, throwing old or contaminated supplies away, notifying other personnel of their need for assistance or washing their hands. For example, when cleansing a patient, often a moist or dampened washcloth or sponge is desirable. Unless the health care provider has a ready source of uncontaminated water to moisten a wash cloth or sponge, the provider must leave the patient's bedside to secure one. Furthermore, a departure may be required in order for a health care provider to replace soiled bed linen with new linen partly because a linen cart with fresh linen may be outside of the patient's room, such as in a main hallway, where the linen cart may be accessed by other health care providers administering to other patients.

The volume of departures required by a health care provider decreases the effectiveness with which health care is administered. This is so because departures increase the time required to completely administer to a particular patient. Also, during departures, undesirable situations may arise which unnecessarily complicate the health care provider's job or the patient's comfort. For instance, after changing the soiled bed linen on a patient's bed, a health care provider who is required to depart in order to deposit the soiled linen in a storage area, may return to find the yet uncleansed patient has returned to the bed thereby re-soiling the freshly changed linen.

Prior attempts have been made to supply a utility cart for use in a hospital or nursing care environment. One such attempt is described in U.S. Pat. No. 5,290,058, entitled MOBILE PEDIATRICS CART issued to Adams et al. Adams et al. discloses a mobile pediatrics cart having a stainless steel housing inside of which are located shelves forming three storage compartments. A door is pivotally joined to the cart to provide access to the shelves. The door pivots outwardly from the housing. Plural drawers adjacent the shelves may be extended to a position outside of the housing. A sink is provided on the cart with a faucet which is operable by a manually operated on/off valve. A storage tank for fresh water and a storage tank for used water is provided on the housing.

The cart disclosed in Adams et al. would not be able to be placed between adjacent beds and used because the pivotable door would prevent adequate access to the shelves defining the storage areas. Specifically, the door would most likely be unable to be pivoted upwardly because of the proximity of the other bed which would prevent the health care provider from accessing the shelves. Moreover, the health care provider utilizing the cart disclosed in Adams et al. could not efficiently administer health care procedures to patients on adjacent beds with the cart parked between the beds because the shelves are accessible from only one side of the cart due to a rear wall which blocks access to the shelves on one side of the cart. Thus, in order to efficiently use the cart, the health care provider would not be able to park the cart between the beds but instead would have to leave the cart in an area at the foot of one of the beds.

Furthermore, the manually operable on/off switch for turning the water supply on increases the chances of spreading germs among patients because the health care provider must physically touch the switch to turn on the supply which increases the chances that germs will remain behind.

Although a number of utility carts for use in the health care industry are known, such carts are limited in utility because they fail to provide adequate access to the storage areas of the cart and increase the chances of cross-contamination of patients by employing manually operable water faucets.

With the above problems in mind, it is an object of the present invention to provide a utility cart for use in the health care industry which minimizes the number of departures required by a health care provider.

It is another object of this invention to provide a utility cart which facilitates and enhances the efficiency with which bedside administration of patient care may be provided.

It is another object of this invention to provide a utility cart which materially enhances the cleanliness with which procedures are administered and reduces the possibility that bacteria or virus will be passed on to other patients.

In a preferred embodiment, the invention takes the form of a utility cart for facilitating patient care and supporting patient care material including a frame mounted on a plurality of wheels having first and second vertical support members on the frame defining at least one storage area. Shelf structure slidably mounted between the first and second vertical support members includes at least one shelf which is bi-directionally extendable on either side of the cart and a drawer, similarly mounted between the first and second support members which may be extended on either side of the cart. A sink is provided on the frame for receiving and holding liquid which is stored in a storage tank and supplied thereto by faucet structure adjacent the sink and a pump for supplying such stored liquid from the tank to the faucet structure. Photosensitive frame-mounted switches adjacent the faucet structure detect movement adjacent the faucet structure and, in response thereto, enable the pump to supply such stored liquid from the storage tank, through the faucet structure and into the sink. Thus, the switches and pump provide for the automatic no-contact dispensing of liquid. A power supply is provided on the frame for distributing power to the photosensitive switch.

Other features of the preferred embodiment of the present invention include but are not limited to: plural faucets for dispensing water, soap and moisturizing lotion; plural storage tanks or containers for storing water, waste water, and/or soaps and lotions; dual spaced storage cabinets, one for storing waste articles and one for housing the storage tanks; and, electronic communication equipment for receiving, recording and relaying patient data and communicating with a remote location.

These and additional object and advantages of the present invention will be more readily understood after a consideration of the drawings and the detailed description of the preferred embodiment.

DETAILED DESCRIPTION OF THE PREFERRED EMBODIMENT

Figure 1:
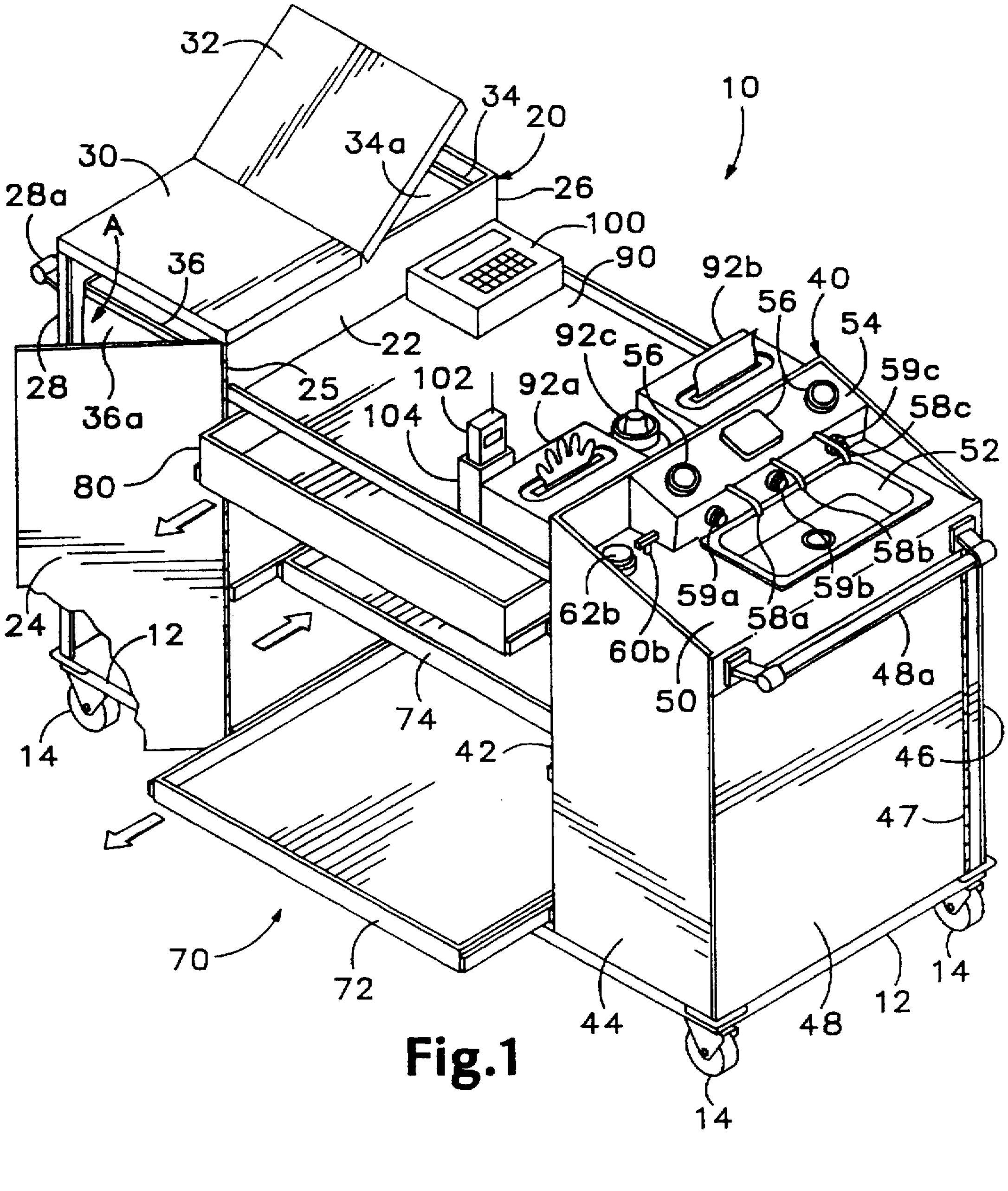
FIG. 1 is an isometric view of the cart of the invention with a portion thereof broken away to shown detail, made in accordance with its preferred embodiment.
Figure 2:
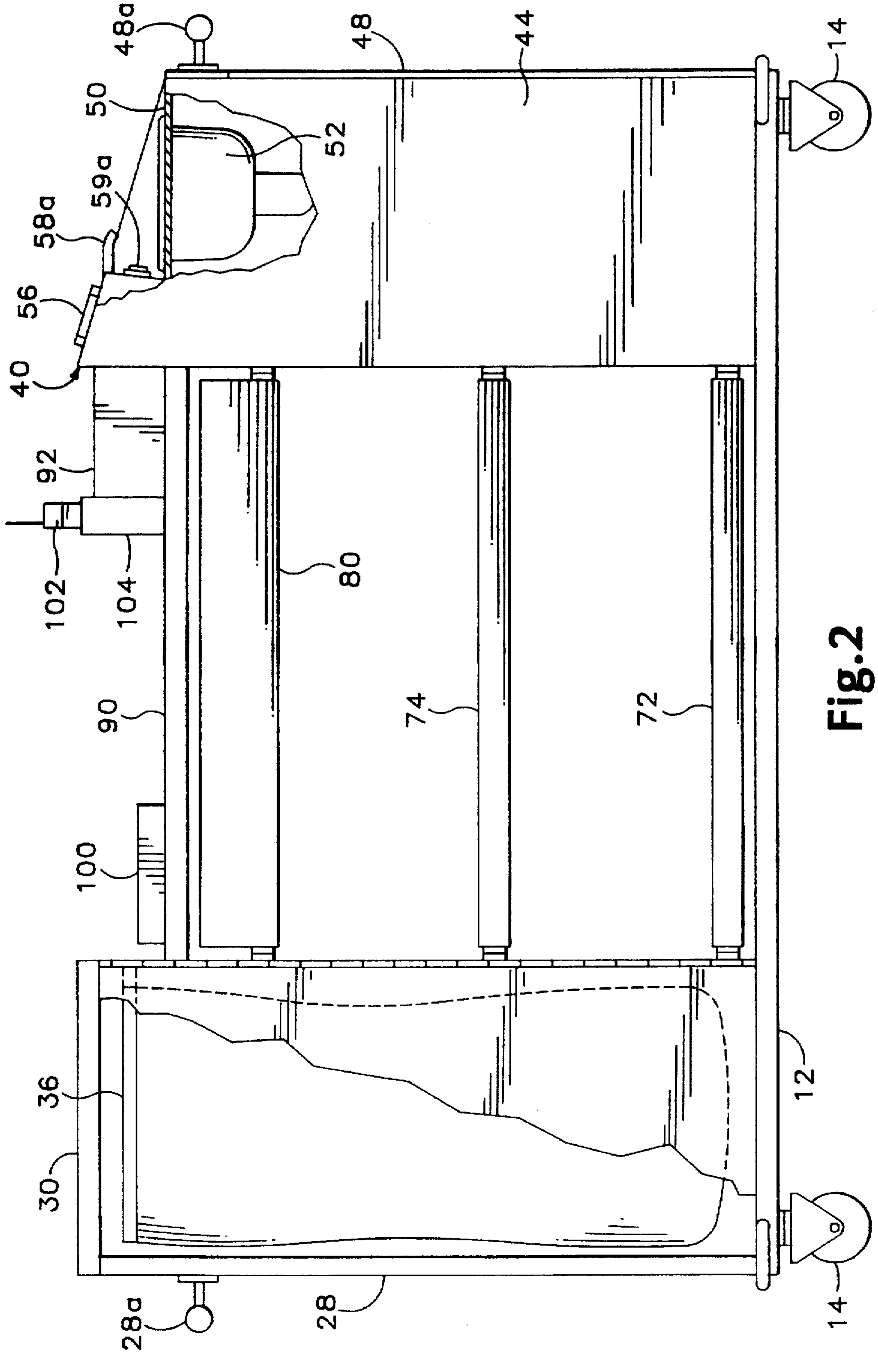
FIG. 2 is a side elevation of the cart with a portion thereof broken away to show detail.
Figure 3:
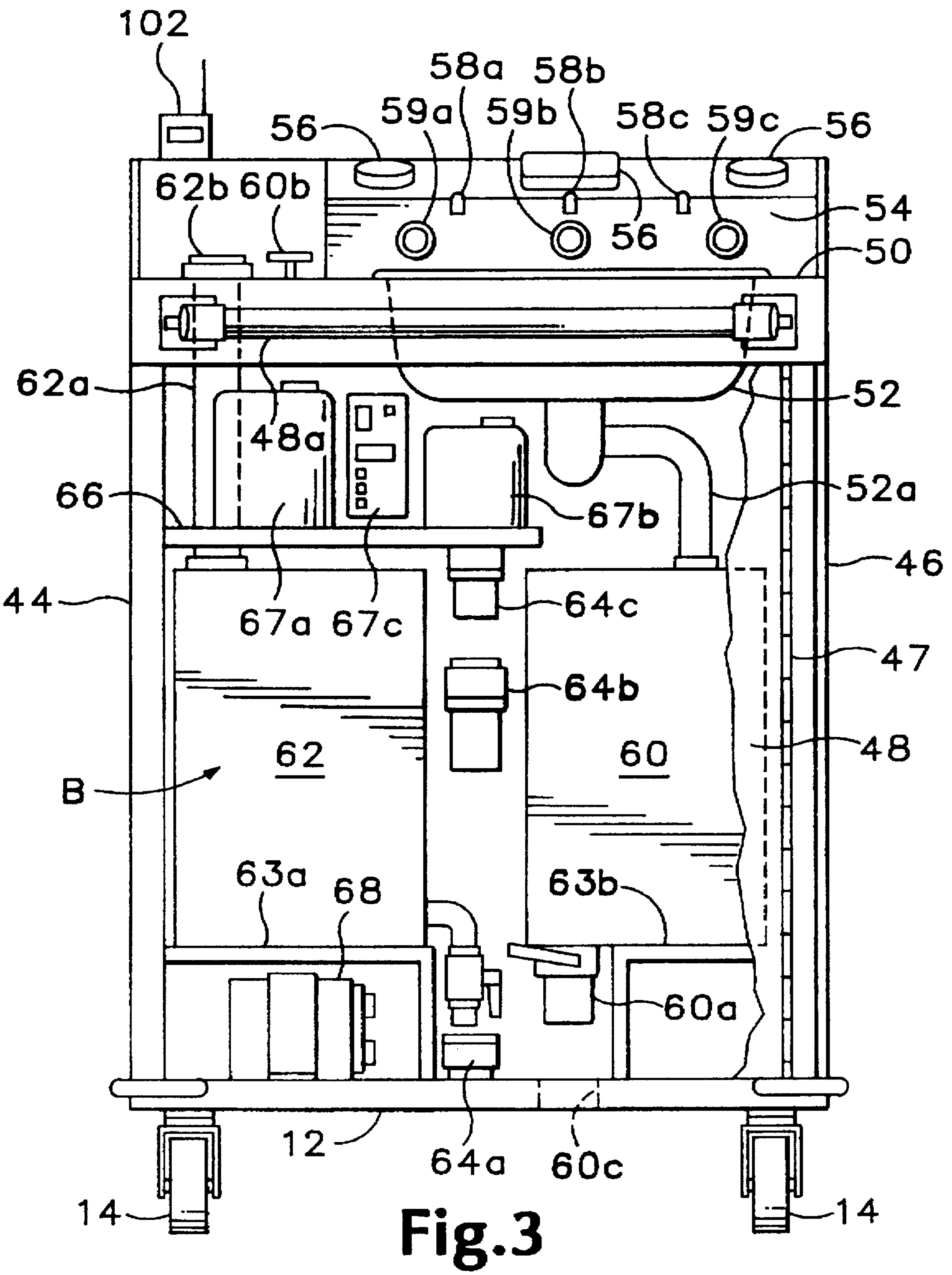
FIG. 3 is a rear elevation of the cart with a portion thereof broken away to show detail.

Referring to FIGS. 1 through 3, a utility cart 10 is provided according to the present invention for facilitating patient care and supporting patient care material. Cart 10 is suitably mobile and able to store various patient care material associated with the provision of nursing, medical and other health care. By way of material is meant equipment, supplies, and medication associated with and necessary for the provision of nursing or medical care in the nursing homes or hospital environments. Although cart 10 is described in these environments, it will be appreciated that the cart is equally useful in other fields of endeavor. To that end, cart 10 includes a frame 12 mounted on a plurality of wheels 14, preferably two of which being caster-type wheels with a locking feature. Caster-type wheels enhance the steerability of the cart thereby increasing its mobility, while the locking feature enables the cart to be placed and remain safely situated in one area.

A first vertical support member 20 is mounted on frame 12 at what may be considered the front of cart 10, and includes first wall structure in the form of plural rectangular walls 22, 24, 26, and 28 defining a storage area A. Walls 22 and 28 are mounted to the frame in a substantially parallel relation and are joined at their long ends to walls 24 and 26, which may be selectively maintained in a substantially parallel configuration. A handle 28a is mounted to wall 28 in an upper region thereof. Access to storage A may be had via wall 24 which is hingedly joined to wall 22 by a suitable piano hinge 25 and may be opened in the direction shown in FIG. 1. Similar access to storage area A may be had via wall 26 which is similarly hingedly joined to wall 22 via a piano hinge which is not shown. Another way of describing support member 20 is that walls 22–28 form what may be viewed as a first cabinet structure defining storage area A, with such area being accessible by a door in the form of hingedly mounted wall 24.

Figure 4:
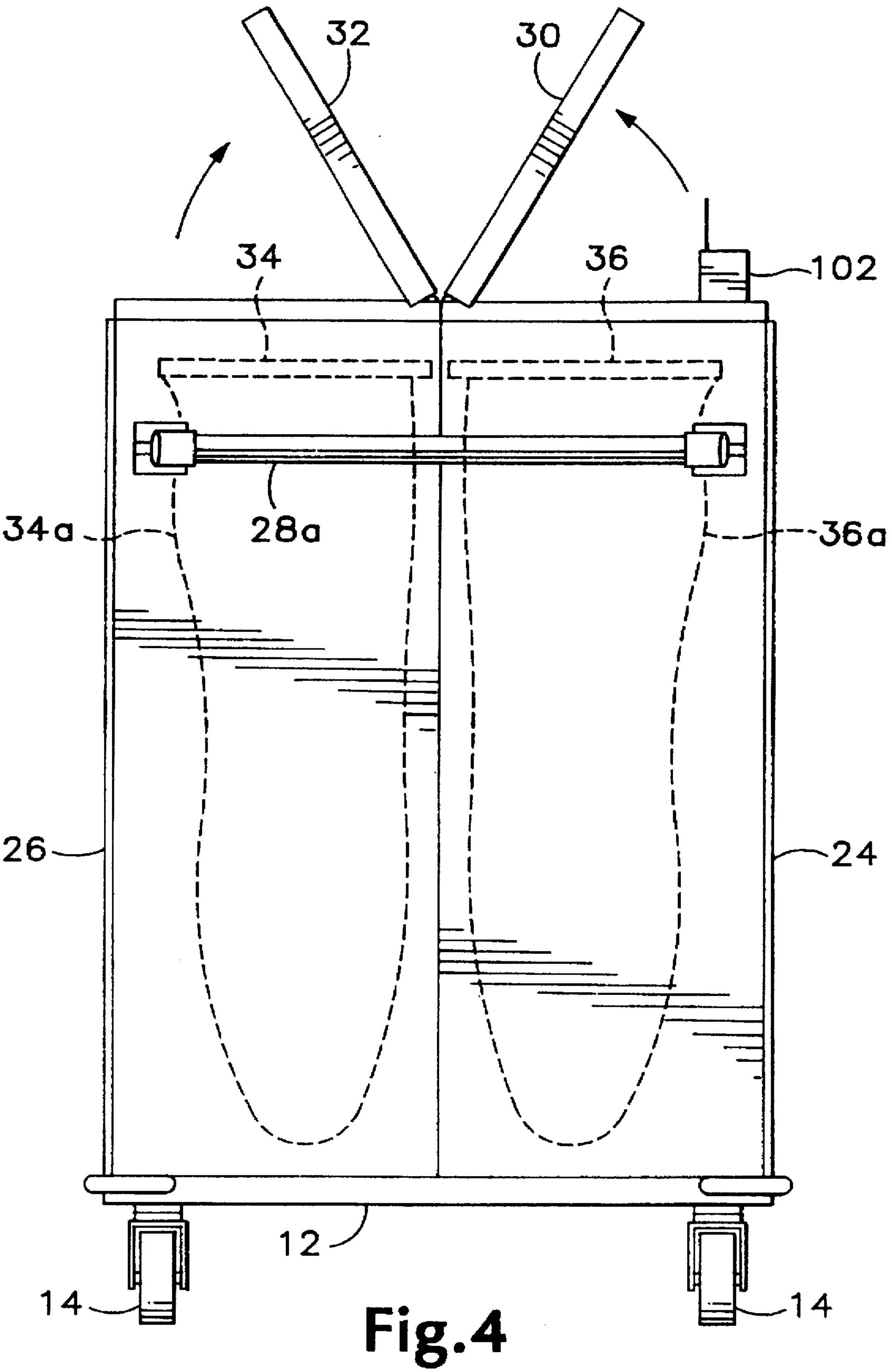
FIG. 4 is a front elevation of the cart with a portion thereof broken away to show detail.

Dual lids 30 and 32 are hingedly connected between walls 22 and 28 and allow access to storage area A from the top of the first wall structure. When the lids are in the closed position, they form a top which defines a substantially horizontal surface. Lid 32 is shown partially pivoted from its closed position. Lid 30 pivots similarly only in an opposite direction which is shown in FIG. 4.

With lid 32 pivoted upwardly and wall 24 pivoted outwardly as shown in FIG. 1, rim structure in the upper portion of storage area A may be seen to include plural brackets 34 and 36 located internally of walls 22 through 28 and joined to wall 22 by any suitable means, for carrying plural disposal bags 34a and 36a, the ends of which are looped over the brackets and conventionally captured thereon. In an alternative embodiment, walls 24 through 28 and lids 30 and 32 may be removed for openly carrying bags 34a and 36a.

A second vertical support member 40 is mounted on frame 12 and spaced from first vertical support member 20 at what may be considered the rear of cart 10, and includes second wall structure in the form of plural rectangular walls 42, 44, 46, and 48 defining a second storage area B most easily seen in FIG. 3. Walls 42 and 48 (FIG. 1) are mounted on the frame to be selectively substantially parallel to one another and are joined at their long ends to walls 44 and 46, which are substantially parallel to one another. Access to storage area B may be had via wall 48 which is hingedly joined to wall 46, by a suitable piano hinge 47 and a handle 48a is mounted adjacent wall 48.

Second vertical support member 40 may alternatively be described as including second cabinet structure formed by walls 42 through 48, wherein such cabinet structure includes a hingedly mounted wall or door 48 for access to storage area B.

Referring to FIGS. 1 through 3, it will be seen that support member 40 includes a top 50 defining a substantially horizontal surface which includes a recess in a portion thereof defining a sink 52 for receiving and holding a liquid. A console 54 on top 50 and adjacent sink 52 includes plural information-conveying gauges 56 which may take the form of any suitable gauges capable of supplying useful information to a cart user. In the preferred embodiment gauges 56 include fluid level indicators for storage tanks located in storage area B and described in more detail below, and a real time digital clock with a timing feature for assisting in timed procedures.

Faucet structure including plural faucets 58*a*, 58*b*, and 58*c* mounted on console 54 adjacent and above sink 52, provide for the dispensing of various liquids which may be held in the storage tanks described below. Photosensitive switches 59*a*, 59*b*, and 59*c* on the console are mounted adjacent faucets 58*a*, 58*b*, and 58*c*, respectively, with one switch operatively connected with the corresponding faucet above to enable the same to automatically dispense yet-to-be-described liquid stored in storage area B. Preferably the switches are of the type which use retro-reflective microswitching utilizing an invisible beam having a shortened length of around 3-inches, to detect movement adjacent the faucets.

Referring specifically to FIG. 3, the reader will see that a first storage tank 60 and a second storage tank 62 are supported by, or mounted to, frame 12 in storage area B as shown and may be employed therein for storing various liquids associated with the cart's use. Such liquid includes water, waste water conveyed from the sink, or any other type of liquid. Tanks 60 and 62 are easily removable and in the preferred embodiment, first storage tank 60 holds waste water conveyed thereto from sink 52 via a drain in the sink connected to a suitable conduit 52*a*. Tank 60 is provided with a conventional drainage or slice valve 60*a* which is connected by a cable (not shown) to a T-handle 60*b* on top 50 adjacent console 54 for opening the valve and draining the contents held therein through an aperture 60*c* in the floor of the cart and into a suitable container (not shown) located externally of the cart.

Second storage tank 62 holds fresh water which is preferably heated prior to introduction into the tank and kept warm by conventional insulation (not shown) which is wrapped around the tank in any suitable manner. The heated fresh water is introduced into tank 62 via a conduit 62*a* attached at one end to the tank, with the other end extending upwardly therefrom and through top 50 to define a filler port 62*b*. A support floor 63*a* is attached to wall 44 as shown and extends partially across storage area B to provide a surface for supporting tank 62. A suitable power supply means 68 in the form, for example, of a DC battery is located beneath floor 63*a* and is operatively connected to photosensitive switches 59*a* through 59*c* for supplying power thereto. A support floor 63*b* is attached to wall 46 as shown and extends partially across storage area B to provide a surface for supporting tank 60.

A shelf 66 in storage area B above tanks 60 and 62 allows for additional items to be stored thereon such as containers 67*a* and 67*b* which are conventional bag-in-box containers for holding moisturizer and soap for dispensing through the faucet structure described above. Conventional pumps 64*a*, 64*b* and 64*c* are provided for conveying fresh water, moisturizer, and soap respectively through the faucet structure described above. The pumps may be of any suitable type including diaphragm, impeller, or peristaltic pumps. A standard PC board 67*c* is operatively connected between switches 59*a* through 59*c* and pumps 64*a* through 64*c* for enabling a corresponding one of the pumps to supply liquid through the faucet to which it corresponds, in an arrangement which is described in more detail below. In the preferred embodiment, container 67*a* is connected to faucet 58*a*, tank 62 is connected to faucet 58*b*, and container 67*b* is connected to faucet 58*c*.

Referring back to FIG. 1, it is seen that cart 10 includes shelf structure indicated generally at 70 in the form of plural shelves 72 and 74 which are slidably mounted between first and second vertical support members 20 and 40. Lower shelf 72 and upper shelf 74 are bi-directionally extendable on either side of cart 10 and by way of example are shown with lower shelf 72 extended in the direction of the arrow downwardly and to the left, while upper shelf 74 is extended in the direction of the arrow upwardly and to the right. Alternatively, each shelf may be extended on the opposite side from the side shown, hence giving the shelves bi-directional capability. The bi-directional capability has particular utility in environments wherein care is sought to be administered on adjacent sides of the cart, and the necessary material may be placed on one shelf so that the cart need not be moved to administer the care or access the material contained thereon.

A bi-directionally extendable drawer 80 is slidably mounted between first and second vertical support members 20 and 40 and may be similarly extended on either side of cart 10. It will be appreciated by those of skill in the art that shelves 72 and 74 and drawer 80 may be conventionally mounted by any suitable telescopic track means 76 which allows bi-directional movement as indicated by directional arrow 76*a* and that detents 78 may be included on the track means to prevent the shelves or drawer from being over-extended and becoming detached from the cart. Ball bearings subsystems 82 may be used to render smooth and quiet their operation.

Work surface 90 is attached to and extends between first and second vertical support members 20 and 40 and provides a useful staging area for placing material during various procedures administered by the user. For instance, conventional electronic communication structure such as a personal digital assistant or electronic clipboard means 100 or two-way radio 102 for communicating with remote locations like a nurse's station may be mounted on work surface 90 so that the same is easily accessed by the cart's user. A conventional pigeon-hole holder 104 may be mounted to surface 90 for holding the two-way radio. As is most easily seen in FIG. 1, slotted dispensers 92*a* and 92*b* mounted on surface 90 are provided for carrying a supply of rubber gloves, wet or dry paper towels, etc. A paper cup dispenser 92*c* is provided on surface 90 between dispensers 92*a* and 92*b* for carrying a supply of paper cups.

Summarizing now, the illustrated cart is a suitably mobile cart having a frame mounted on a plurality of wheels. Designed for facilitating patient care and supporting patient care material, the cart may but need not be provided with two spaced storage areas defined by plural joined walls, wherein at least one of the walls is hingedly joined to an adjacent wall for allowing access to the storage area or areas. One of the storage areas includes a top defining a substantially horizontal surface which includes a recess defining a sink. Plural faucets mounted on a console adjacent the sink are operatively connected to storage tanks therebeneath and ensure that a fresh supply of water, soap, or lotion may be accessed through a no-contact dispensing procedure in which the photosensitive switches mounted adjacent each faucet detect movement thereabout and in response thereto dispense the stored water, soap, or lotion. Plural information-conveying gauges on the console provide useful information for the user such as remnant fluid levels.

The utility of the cart is further enhanced by plural shelves which are bi-directionally extendable on either side of the cart, as is a drawer which is similarly mounted adjacent the shelves. By virtue of the bi-directional shelves and drawer, the cart may be used in compact places where other carts fail to be useful.

Although the cart is described in the context of a nursing home or hospital, it should be readily apparent that the cart is not confined to utility in these areas only. But rather, the cart would find use in any environment wherein it would be useful to have a mobile cart with automatically dispensing no-contact faucets for dispensing liquid and bi-directionally extendable shelves or drawers as described above.

Cart 10 is preferably made from anodized aluminum which has properties most suitable in a health care environment which include that it may be easily cleaned and disinfected to ensure that after use, germs and other bacteria or virus are not passed along to other recipients of the cart's services. In an alternative embodiment, the cart may be constructed of rugged and durable plastic of any suitable type. Because of the light-weight construction, the cart is easily transported from one place to another so that a user need not expend a great deal of energy to move the cart from location to location.

Operation

Briefly, it will be appreciated that, in operation, cart 10 may be pushed in either direction by a user, by simply grasping either of the handles 28*a* or 48*a* and urging the cart in the desired direction. The caster-type wheels allow for easy maneuverability, which is ideal in environments such as nursing homes or hospitals where patients may be closely located on adjacent beds. The user may simply wheel the cart to a desired position between the beds and administer to required health care. The plural bi-directionally extendable shelves permit one user to have available sources of material intended for use on either side of the cart. When a user needs to temporarily or permanently dispose of contaminated materials, storage areas on the cart provide the means for their safe and secure disposal.

Figure 5:
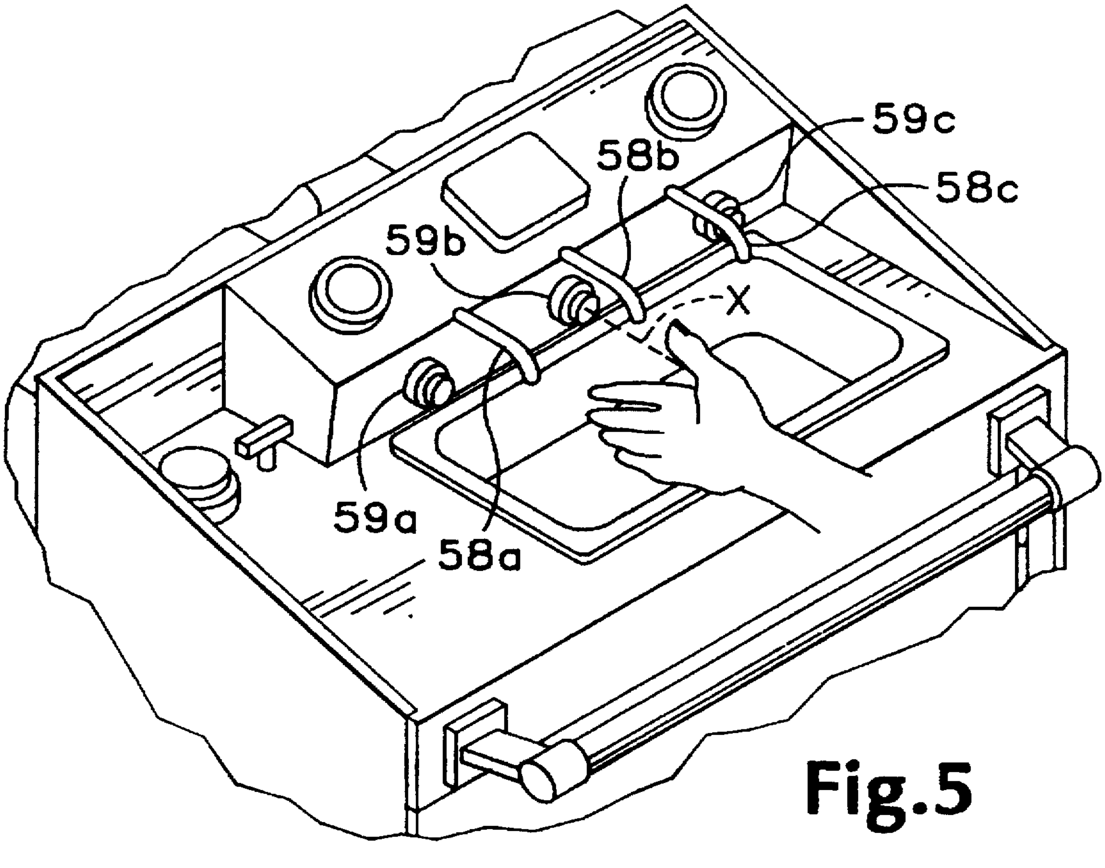
FIG. 5 is an enlarged isometric view of a sink and faucet structure of the present invention.
Figure 6:
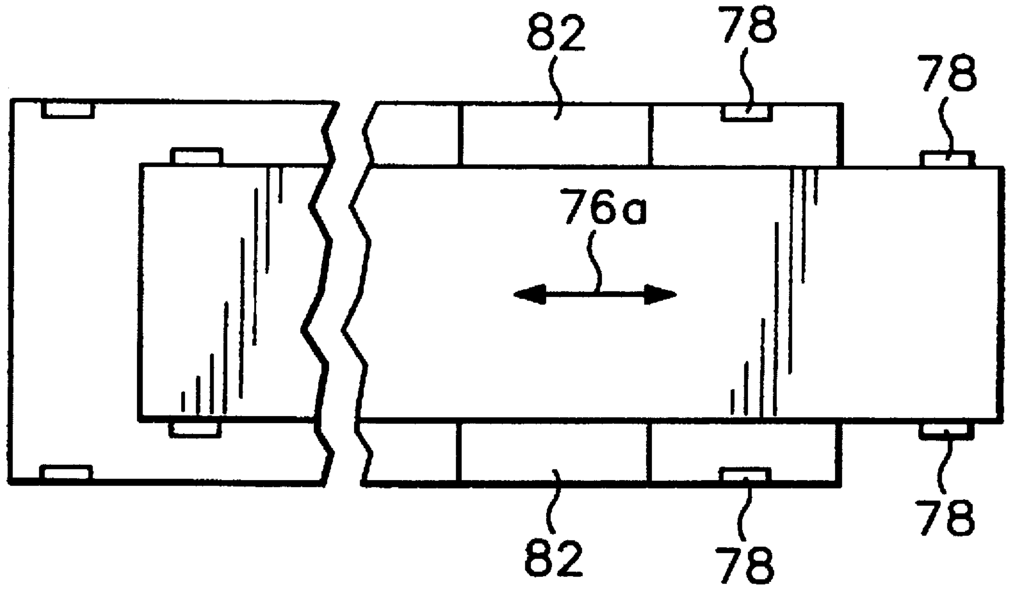
FIG. 6 is a greatly enlarged, fragmentary cabinet schematic drawing of a drawer slide for use in connection with the present invention.

If during the course of the cart's use, the user has a need to wash their hands, for instance, if proceeding to a new patient or in the event of inadvertent contamination, the no-contact faucets enable a user to wash with soap and warm clean water without the risk of leaving behind germs on an on/off switch or faucet handle. More specifically and with reference to FIG. 5, the reader will see a user's hand in the area adjacent and in front of switch 58*b*. Dashed line X represents the detection of the user's hand by the switch just prior to the dispensing of liquid. When such movement is detected, the PC board which is electronically coupled to each switch, enables the corresponding pump to supply liquid stored within storage area B through the selected faucets and to a user. Switches 59*a* and 59*c*, for enabling the dispensing of soap and moisturizer, are not directly beneath the faucet to which they correspond (like switch 59*b*), but rather are laterally offset so that they are not inadvertently triggered when a user desires only to wash with water from faucet 58*b*. As discussed above the PC board enables each faucet to independently dispense either water, soap, or moisturizer, the latter two being conventionally supplied preferably via bag-in-box containers. Contents from sink 52 are conveyed from the sink and into tank 60 (FIG. 3) for storage until subsequent disposal. To dispose of the contents, the user simply wheels the cart to a disposal location, pulls T-handle 60*b* upwardly which opens slice valve 60*a* on tank 60 for drainage through aperture 60*c* in the bottom of the cart and into a suitable container (not shown).

The cart is also provided with communications equipment for communicating with a remote location such as a nurse's station which enables a user to retrieve or relay pertinent information in the event such an need arises. For example, with the two-way radios, a user may radio for assistance or request additional supplies. With a personal digital assistant, the user may not only access information relating to specific patients such as medication schedules, but may record pertinent data such as current patient condition, with such information accessible by subsequent users of the cart.

While the present invention has been shown and described with reference to the foregoing preferred embodiment, it will be apparent to those skilled in the art that other changes in form and detail may be made therein without departing from the spirit and scope of the invention as defined in the appended claims.

I claim:

1. A utility cart for facilitating patient care and supporting patient care material comprising:
- a frame mounted on a plurality of wheels;
- a first vertical support member mounted to said frame, said first vertical support including first wall structure defining a first storage area for storing material;
- a second vertical support member mounted to said frame, said second vertical support member being spaced from said first vertical support member and including cabinet structure defining a second storage area, a door for access to said second storage area and a top defining a substantially horizontal surface, wherein said surface includes a recess formed therein defining a sink for receiving and holding water; and
- shelf structure slidably mounted to said first and said second vertical support members, said shelf structure including a first shelf that is bi-directionally extendable on either side of the cart.

2. The cart of claim 1, wherein said shelf structure includes plural shelves, wherein each of said shelves is bi-directionally extendable on either side of the cart.

3. The cart of claim 1 further comprising a drawer slidably mounted between said first and second vertical support members, wherein said drawer is bi-directionally extendable on either side of the cart.

4. The cart of claim 1, wherein said first vertical support member includes rim structure joined thereto for supporting patient care material.

5. The cart of claim 1, wherein said second vertical support member further comprises second wall structure joined thereto, said second wall structure defining a second storage area.

6. The cart of claim 1 further comprising a console mounted on said top, wherein said console includes plural information-conveying gauges.

7. The cart of claim 1, wherein said first cabinet structure includes a door for access to said first storage area.

8. The cart of claim 7, wherein said first cabinet structure includes a top defining a first substantially horizontal surface, wherein said top includes a hingedly mounted lid which provides access to said first storage area.

9. The cart of claim 1 further comprising electronic communication structure mounted to said cart which structure includes an electronic communication device for communicating with locations removed from said cart.

10. The cart of claim 9, wherein said electronic communications device includes an electronic clipboard.

11. The cart of claim 10, wherein said communications device includes a mobile communication device for allowing two-way communications with a remote location.

12. The cart of claim 1 further comprising a first and a second push bar wherein said first push bar is joined to said first vertical support member and wherein said second push bar is joined to said second vertical support member, said push bars for enabling a user to move said cart.

13. The cart of claim 1 further comprising:

a first storage tank on said frame for storing liquid for use in said sink;

faucet structure on said frame adjacent said sink for dispensing such stored liquid into said sink;

a pump on said frame for supplying such stored liquid to said faucet structure;

a photosensitive switch adjacent said faucet structure for detecting movement adjacent said faucet structure and, in response thereto, said switch enabling said pump to supply such stored liquid from said storage structure to said faucet structure, said switch thereby providing for the automatic no-contact dispensing of liquid from said faucet structure; and a power supply on said frame for distributing power to said photosensitive switch.

14. A portable multi-purpose utility cart comprising:

a rectangular frame mounted on a plurality of wheels, said frame including a front portion, a rear portion, and an intermediate portion therebetween;

a first cabinet mounted on said frame at said front portion thereof, said cabinet defining a first storage area, wherein said first cabinet includes a door for access to said first storage area, and further wherein said first cabinet includes a pivotable top defining a first horizontal work area, for access to said first storage area;

a second cabinet mounted on said frame at said rear portion defining a second storage area, wherein said second cabinet includes a door for access to said second storage area, and further wherein said second cabinet includes a top defining a second horizontal work area wherein said second horizontal work area includes a recess formed therein defining a sink wherein said sink includes a drain and conduit structure connected to said drain;

a first storage tank on said frame for storing water for use in said sink;

faucet structure mounted on said second cabinet for dispensing liquid therethrough;

a pump on said frame for supplying water from said first storage tank to said faucet structure;

a second storage tank attached to said conduit structure for receiving and storing used water from the sink, such water being conveyed from said sink via said drain and conduit;

plural shelves slidably mounted between said first and second cabinets and in said intermediate portion of said frame, wherein each of said shelves is bi-directionally extendable on either side of said cart; and a drawer slidably mounted between said first and second cabinets in said intermediate portion of said frame and adjacent said shelves, said drawer being bi-directionally extendable on either side of said cart.

15. The cart of claim 14 further comprising plural photosensitive switches mounted on said second cabinet and operatively connected between said pump and said faucet structure for detecting movement adjacent said switches and enabling said pump to automatically supply such liquid to said faucet structure.

16. A utility cart for facilitating patient care and supporting patient care material comprising:

a frame mounted on a plurality of wheels;

a first vertical support member mounted to said frame and defining a storage compartment containing disposal bags;

a second vertical support member mounted to said frame, said second vertical support member being spaced from said first vertical support member and containing a sink; and shelf structure slidably mounted to said first and said second vertical support members, said shelf structure including a first shelf that is bi-directionally extendable on either side of the cart and that is mounted on a track with detents to inhibit detachment from the cart.

17. The cart of claim 16 further comprising;

a storage structure including a first storage tank on said frame for storing liquid for use in said sink;

a faucet structure on said frame adjacent said sink for dispensing such stored liquid into said sink;

a pump on said frame for supplying such stored liquid to said faucet structure;

a photosensitive frame-mounted switch adjacent said faucet structure, said switch for detecting movement adjacent said faucet structure and, in response thereto, said switch enabling said pump to supply such stored liquid from said storage structure to said faucet structure, said switch thereby providing for the automatic no-contact dispensing of liquid from said faucet structure; and a power supply on said frame for distributing power to said switch.

18. The cart of claim 17 wherein said storage structure includes a second storage tank for storing used liquid and further wherein said sink includes a drain and a conduit connecting said drain and said second storage tank for moving liquids from said sink through said drain and into said second storage tank.

19. The cart of claim 17, wherein said faucet structure includes plural faucets for dispensing liquids.

20. The cart of claim 17, wherein said storage structure includes plural storage tanks for storing liquid and wherein each of said storage tanks is connected to a corresponding one of said plural faucets.

21. The cart of claim 17, wherein said first storage tank is for storing water and wherein at least one of said plural storage tanks is for storing soap or moisturizer.

22. The cart of claim 17, further comprising a heater on said first storage tank for heating liquid stored therein.

23. The claim 16, further comprising cabinet structure mounted on said frame defining a storage area, said cabinet structure including two substantially parallel walls forming the sides of said structure, a rear wall joined to said sides forming the rear of said structure and a front wall joined to said sides and substantially parallel to said rear wall, said front wall forming the front of said structure, and wherein at least one of said walls is hingedly attached to an adjacent wall to provide access to said storage area.

24. The cart of claim 23, wherein said cabinet structure further includes a top mounted on said sides between said front and rear of said structure defining a substantially horizontal work area and having formed therein a recessed portion defining said sink.

* * * * *